United States Patent
Jin

(10) Patent No.: US 10,409,337 B2
(45) Date of Patent: Sep. 10, 2019

(54) DISPLAY DEVICE COMPRISING PRISM SHEET BETWEEN A WINDOW MEMBER AND A PROXIMITY SENSOR

(71) Applicant: Samsung Display Co., Ltd, Yongin-si, Gyeonggi-do (KR)

(72) Inventor: Kyongbin Jin, Suwon-si (KR)

(73) Assignee: Samsung Display Co., Ltd. (KR)

( * ) Notice: Subject to any disclaimer, the term of this patent is extended or adjusted under 35 U.S.C. 154(b) by 163 days.

(21) Appl. No.: 15/442,504

(22) Filed: Feb. 24, 2017

(65) Prior Publication Data
US 2017/0262026 A1    Sep. 14, 2017

(30) Foreign Application Priority Data

Mar. 9, 2016   (KR) .................. 10-2016-0028479

(51) Int. Cl.
*G06F 1/16* (2006.01)
*G01S 17/08* (2006.01)
(Continued)

(52) U.S. Cl.
CPC ............ *G06F 1/1684* (2013.01); *G01S 17/08* (2013.01); *G02B 5/04* (2013.01); *G02B 5/208* (2013.01); *G06F 1/1637* (2013.01); *G06F 1/3231* (2013.01); *G06F 1/3265* (2013.01); *H04M 1/0266* (2013.01); *Y02D 10/153* (2018.01); *Y02D 10/173* (2018.01)

(58) Field of Classification Search
CPC .... G06F 1/1684; G06F 1/3265; G06F 1/3231; G06F 1/1637; G01S 17/08; H04M 1/0266; G02B 5/208; G02B 5/04; Y02D 10/173; Y02D 10/153
See application file for complete search history.

(56) References Cited

U.S. PATENT DOCUMENTS 6,236,477 B1 *  5/2001  Ishihara ................ G02B 5/045
                                                  359/618
6,799,859 B1 * 10/2004  Ida ....................... G02B 6/0036
                                                  362/335
(Continued)

FOREIGN PATENT DOCUMENTS

| KR | 10-2008-0028270 A | 3/2008 |
| KR | 10-2010-0081094 A | 7/2010 |
| KR | 10-2014-0080256 A | 6/2014 |

*Primary Examiner* — Que Tan Le
*Assistant Examiner* — Jennifer D Bennett
(74) *Attorney, Agent, or Firm* — Innovation Counsel LLP

(57) ABSTRACT

A display device includes a display panel configured to display an image, a window member covering the display panel and having a sensing area provided with a first opening and a second opening, a proximity sensor which overlaps with the sensing area and is configured to provide a first light to the window member through the first opening and receive through the second opening, a portion of a second light defined as a reflected light of the first light, and an optical member including a prism sheet disposed between the window member and the proximity sensor. A first angle between the first light incident from the proximity sensor to the prism sheet and a normal line of the window member is greater than a second angle between the first light which passes through the prism sheet and the normal line of the window member.

19 Claims, 11 Drawing Sheets

(51) Int. Cl.
*G02B 5/04* (2006.01)
*G02B 5/20* (2006.01)
*G06F 1/3231* (2019.01)
*G06F 1/3234* (2019.01)
*H04M 1/02* (2006.01)

(56) References Cited

U.S. PATENT DOCUMENTS

| | | | | |
|---|---|---|---|---|
| 8,204,283 | B2* | 6/2012 | Wu | G06K 9/00046 |
| | | | | 257/98 |
| 9,189,074 | B2 | 11/2015 | Kuo | |
| 2008/0116359 | A1* | 5/2008 | Asper | G01V 8/12 |
| | | | | 250/221 |
| 2010/0171027 | A1* | 7/2010 | Yun | H03K 17/941 |
| | | | | 250/221 |
| 2012/0037794 | A1* | 2/2012 | Lee | G01S 17/026 |
| | | | | 250/216 |
| 2013/0048837 | A1* | 2/2013 | Pope | G01J 1/0422 |
| | | | | 250/214.1 |
| 2018/0149751 | A1* | 5/2018 | Geiger | G01S 17/08 |

* cited by examiner

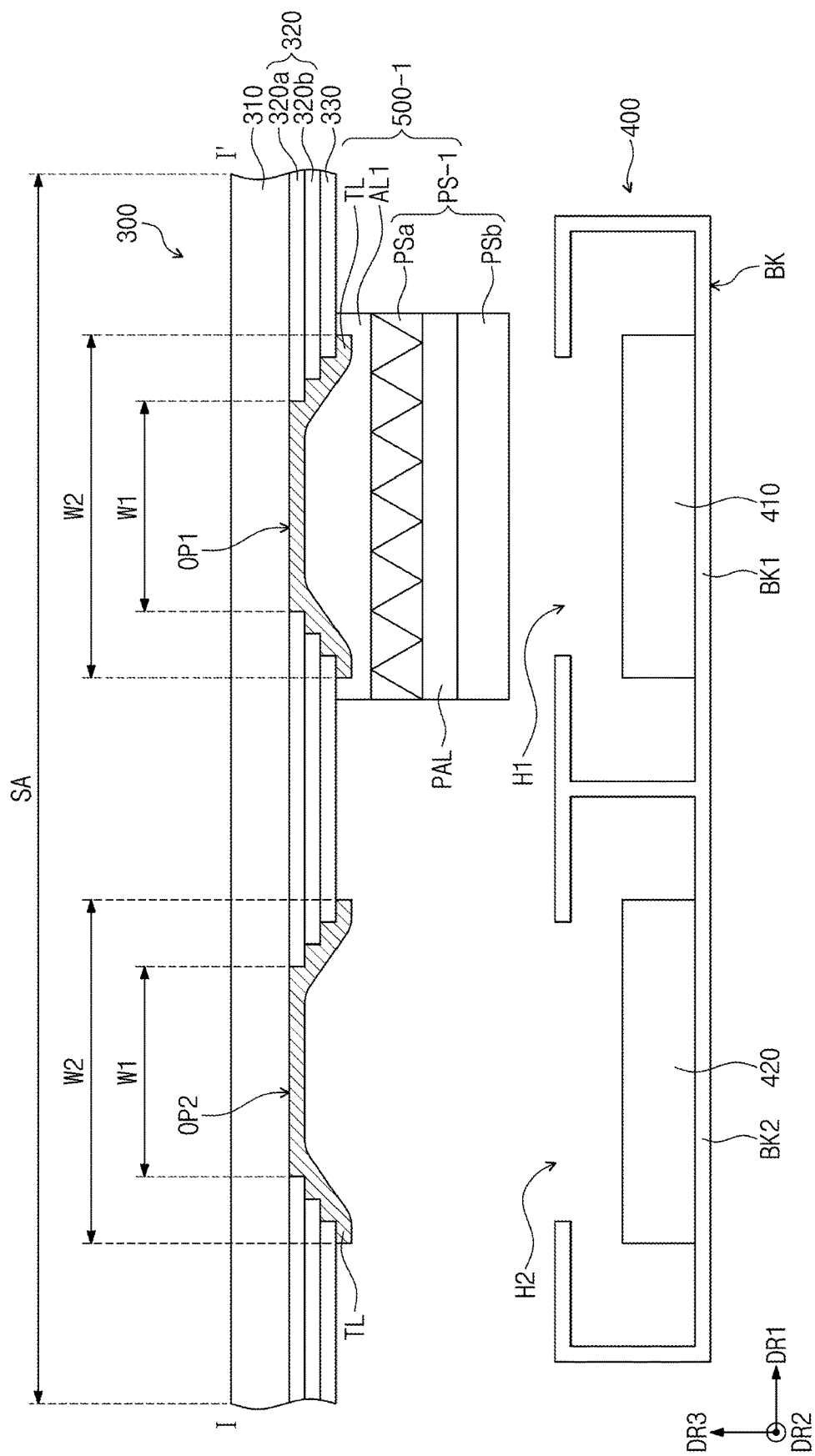

DISPLAY DEVICE COMPRISING PRISM SHEET BETWEEN A WINDOW MEMBER AND A PROXIMITY SENSOR

CROSS-REFERENCE TO RELATED APPLICATIONS

This U.S. non-provisional patent application claims priority under 35 U.S.C. § 119 of Korean Patent Application No. 10-2016-0028479, filed on Mar. 9, 2016, the entire contents of which are hereby incorporated by reference.

BACKGROUND

The present disclosure herein relates to a display device and mobile device, and more particularly, to a display device and mobile device in which reliability of a proximity sensor may be achieved.

As mobile devices become more diversified in function, such mobile devices are becoming realized in the form of multimedia devices having multiple functions such as photograph of video capture, music or video playback, games, and broadcast reception.

Such mobile devices are equipped with proximity sensors which detect the approach of parts such as the hands of people. Being equipped with light-emitting parts which transmit infrared radiation and light-receiving parts which detect reflected infrared radiation, such proximity sensors can detect the approach of people or objects and the like.

SUMMARY

The present disclosure provides a display device and mobile device in which the reliability of a proximity sensor is enhanced.

An embodiment of the inventive concept provides a display device including a display panel which is configured to display an image; a window member covering the display panel and having a first opening and a second opening in a sensing area which is defined on a plane; a proximity sensor which is disposed on the window member so as to overlap with the sensing area, configured to provide a first light to the window member through the first opening and receive a portion of a second light through the second opening, the second light being defined as a reflected light of the first light; and an optical member comprising a prism sheet disposed between the window member and the proximity sensor. A first angle between the first light incident from the proximity sensor to the prism sheet and a normal line of the window member, the normal line being perpendicular to the window member, is greater than a second angle between the first light which passes through the prism sheet and the normal line of the window member.

In an embodiment, the window member may include a base substrate having defined therein a display area which is configured to transmit the image and a non-display area which is adjacent to at least a portion of the display area and includes the sensing area; a first printed layer disposed on the base substrate so as to overlap with the non-display area; and a second printed layer disposed on the first printed layer so as to overlap with at least a portion of the first printed layer. The first opening and the second opening are defined in the first printed layer and the second printed layer.

In an embodiment, the proximity sensor may include a light-emitting part overlapping with the first opening and configured to generate the first light; and a light-receiving part overlapping with the second opening and configured to receive the portion of the second light.

In an embodiment, the optical member may further include a light-transmitting layer disposed between the base substrate and the prism sheet, and overlapping with the first opening and the second opening.

In an embodiment, a transmittance of the light-transmitting layer with respect to light in the wavelength range of infrared radiation may be higher than a transmittance of the light-transmitting layer with respect to light in the wavelength range of visible light.

In an embodiment, the planar width of the light-transmitting layer may be greater than the planar width of the first opening; and the light-transmitting layer may be disposed so as to cover at least a portion of the first and the second printed layers.

In an embodiment, the prism sheet may be disposed so as to overlap with the first opening and the second opening.

In an embodiment, the optical member may further include a first adhesive layer which is disposed between the light-transmitting layer and the prism sheet, and attaches the light-transmitting layer with the prism sheet.

In an embodiment, a portion of the light-transmitting layer may make contact with the base substrate.

In an embodiment, the optical member may further include a second adhesive layer which is disposed between the prism sheet and the proximity sensor, and attaches the prism sheet with the proximity sensor.

In an embodiment, the optical member may further include a third adhesive layer which is disposed between the light-transmitting layer and the base substrate, and attaches the light-transmitting layer with the base substrate.

In an embodiment, the prism sheet may include a first prism layer comprising first prisms arranged in a first direction; and a second prism layer comprising second prisms arranged in a second direction intersecting the first direction.

In an embodiment, the proximity sensor may further include a first bracket which accommodates the light-emitting part; and a second bracket which stores the light-receiving part, wherein a first hole corresponding to the first opening is defined at the first bracket and a second hole corresponding to the second opening is defined at the second bracket.

In an embodiment, the transmittance of the prism sheet with respect to light in the wavelength range of infrared radiation may be greater than the transmittance of the prism sheet with respect to light in the wavelength range of visible light In an embodiment, the first printed layer may have a white color In an embodiment, the second printed layer may have a black color.

In an embodiment, the first light and the second light may have a wavelength range in the wavelength range of infrared radiation.

In an embodiment of the inventive concept, a display device includes a base substrate; a first printed layer which is disposed on the base substrate, is provided with a first opening and a second opening, and is configured to reflect external light; a proximity sensor which is configured to emit a first light toward the first opening and receive through the second opening, a second light which is a reflected light of the first light; and a prism sheet which is disposed between the base substrate and the proximity sensor.

In an embodiment, a first angle between the first light incident from the proximity sensor to the prism sheet and a normal line of the window member, the normal line being perpendicular to window member, may be greater than a second angle between the first light which passes through the prism sheet and the normal line of the window member.

In an embodiment, the first printed layer has a color that is configured to reflect at least 3% of the external light.

BRIEF DESCRIPTION OF THE FIGURES

FIG. 5A is a cross-sectional view illustrating a display device according to another embodiment of the inventive concept;

DETAILED DESCRIPTION

Figure 1:
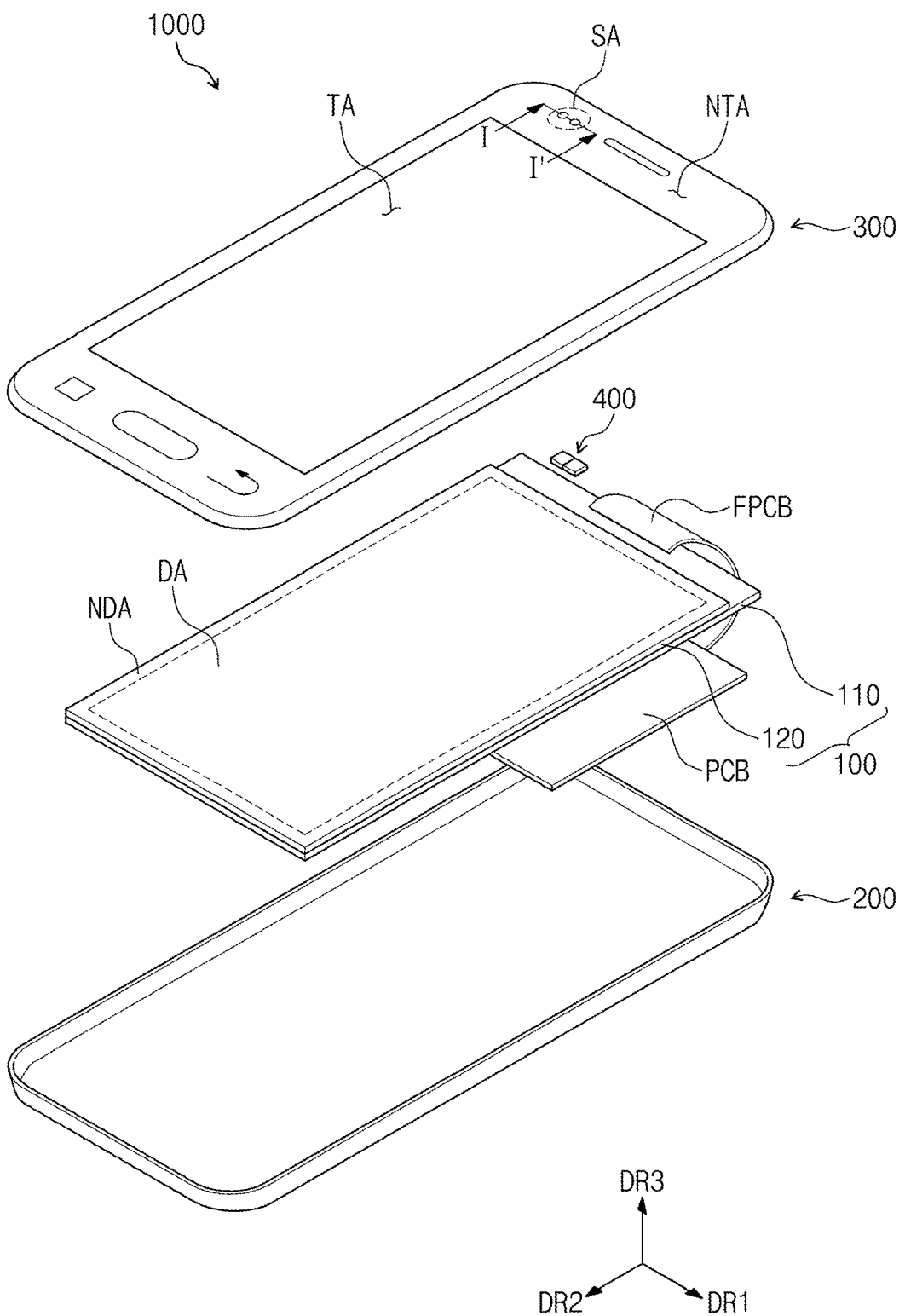
FIG. 1 is an exploded perspective view illustrating a display device according to embodiments of the inventive concept.

Features of the inventive concept, as well as methods for achieving them will be made clear with reference to the accompanying drawings and the embodiments described in detail below. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Therefore, the inventive concept is solely defined by the scope of the claims. Like reference numerals refer to like elements throughout.

It will be understood that when an element or layer is referred to as being "on" another element or layer, it can be directly on the other element or layer or intervening elements or layers may be present. In contrast, when an element is referred to as being "directly on," another element or layer, there are no intervening elements or layers present. As used herein, the term "and/or" includes any and all combinations of one or more of the associated listed items.

Spatially relative terms, such as "below", "beneath", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. Like reference numerals refer to like elements throughout.

It will be understood that, although the terms first, second, etc. may be used herein to describe various components, elements, and/or sections, these components, elements, and/or sections should not be limited by these terms. These terms are only used to distinguish one component, element, or section from another component, element, or section. Thus, a first component, element, or section discussed below could be termed a second component, element, or section without departing from the teachings of the inventive concept.

Embodiments herein are described with reference to ideal schematic plan views or cross-sectional views. Thus, the form of the example diagrams may be modified due to manufacturing techniques and/or allowable tolerances and the like. Thus, the embodiments herein are not limited to specific illustrated forms but include modifications in shape resulting from the manufacturing process. Exemplary areas indicated in the drawings are schematic in nature, and the shapes of the exemplary areas in the drawings are for illustrating particular forms of areas of elements, and are not intended to limit the scope of the inventive concept.

Hereinafter, embodiments will be explained in detail with reference to the accompanying drawings.

FIG. 1 is an exploded perspective view illustrating a display device 1000 according to embodiments of the inventive concept.

FIG. 1 illustrates a mobile device as an example in which the display device 1000 according to an embodiment of the inventive concept is utilized. The mobile device may include a tablet PC, a smartphone, a personal digital assistant (PDA), a portable media player (PMP), a gaming device, a wristwatch-type electronic device, etc. However, embodiments of the inventive concept are not limited thereto. Embodiments of the inventive concept may be used in large-scale electronic devices such as televisions or outdoor advertising displays, and mid-to-small-scale electronic devices such as personal computers, notebook computers, vehicle navigation units, and cameras. Such examples are provided merely as examples and, within the scope of the inventive concept, embodiments thereof may obviously be utilized in other electronic devices.

Referring to FIG. 1, the display device 1000 according to an embodiment of the inventive concept includes a display panel 100, a storage member 200, a window member 300, a proximity sensor 400, and an optical member (not shown).

The display panel 100 displays an image. The display panel 100 includes a display substrate 110 and an opposing substrate 120 which is coupled with the display substrate 110 and faces the display substrate 110. The display substrate 110 is parallel with a plane defined by mutually intersecting first and second directions DR1 and DR2, and a third direction DR3 indicates the normal direction of the display substrate 110. The third direction DR3 is a reference direction for distinguishing between the front face and back face of each member. However, directions indicated by such directions are a relative concept and may be converted into other directions.

The display panel 100 may be a liquid crystal display panel. Thus, although not shown, the display panel 100 may include a liquid crystal layer (not shown) interposed between the display substrate 110 and the opposing substrate 120.

However, embodiments of the inventive concept are not limited by the type of the display panel 100. For example, in other embodiments of the inventive concept, the display panel 100 may be other types of display panels, such as an organic electroluminescence display panel, an electrowetting display panel, and a nanocrystal display panel.

A display area DA and a non-display area NDA are defined on the plane of the display panel 100. Although not shown, the display panel 100 may further include a plurality of pixels (not shown) disposed on the display area DA. The display panel 100 displays an image through the display area DA. The non-display area NDA of the display panel 100 is defined as the area that does not display images. The non-display area NDA surrounds the display area DA.

The display device 1000 may further include a flexible printed circuit board FPCB and a printed circuit board PCB. The flexible printed circuit board FPCB may electrically connect the display panel 100 with the printed circuit board PCB. One end of the flexible printed circuit board FPCB may be connected with a face of the display substrate 110 exposed by the opposing substrate 120, and the other end may be connected with the printed circuit board PCB. The flexible printed circuit board FPCB is flexible and thus in the coupled state, may be bent below the display panel 100.

The printed circuit board PCB may output signals to the display panel 100 or receive signals from the display panel 100 through the flexible printed circuit board FPCB. As the flexible printed circuit board FPCB is bent, the printed circuit board PCB in the coupled state, may be attached to the bottom of the display panel 110.

The storage member 200 stores the display panel 100. The storage member 200 may be coupled with the window member 300 with the display panel 100 therebetween.

In FIG. 1, the storage member 200 composed of a single member is exemplarily illustrated. However, embodiments of the inventive concept are not limited thereto. The storage member 200 according to another exemplary embodiment of the inventive concept may be composed of two or more members coupled together.

The storage member 200 may further store the printed circuit board PCB populated with a plurality of active components (not shown) and/or a plurality of passive components (not shown), the proximity sensor 400, and the optical member in addition to the display panel 100. Moreover, depending on the type of the display device, the storage member 200 may further store a power unit (not shown) such as a battery.

Figure 2:
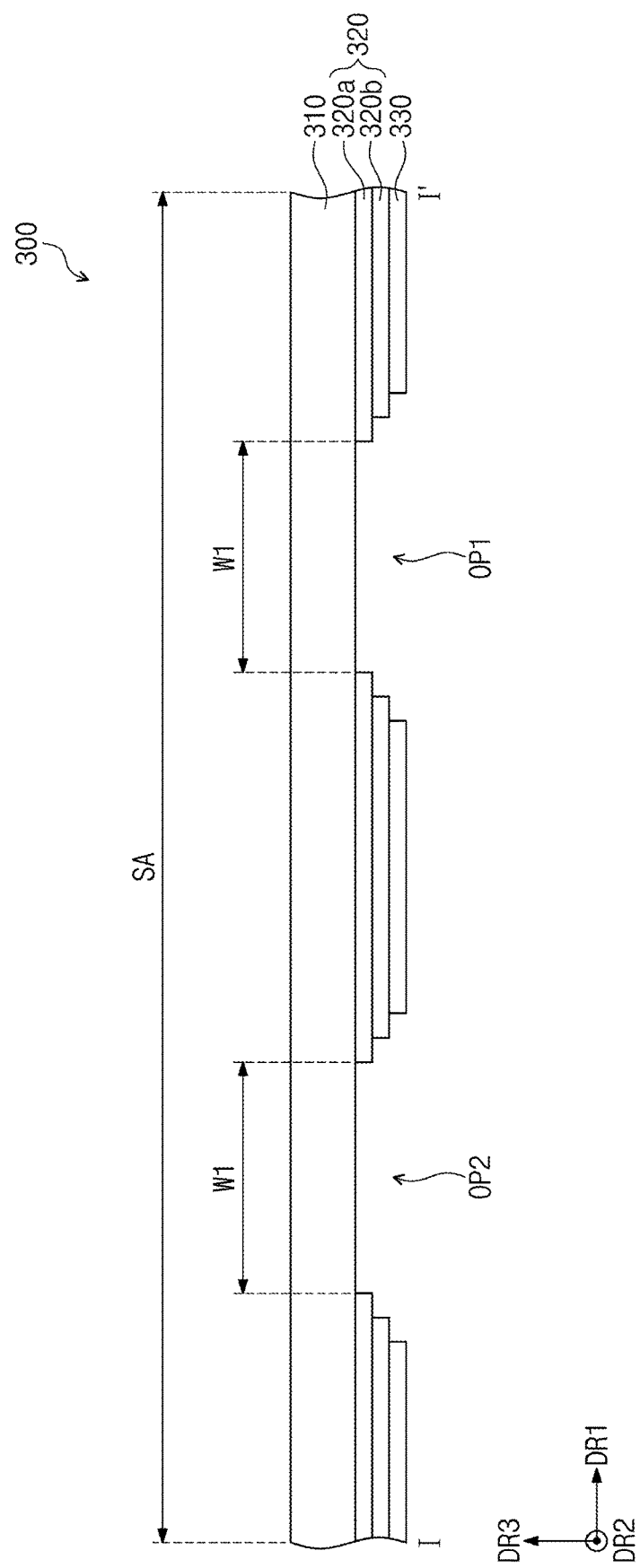
FIG. 2 is a cross-sectional view, along I-I' in FIG. 1, of a window member according to an embodiment of the inventive concept.

FIG. 2 is a cross-sectional view, along I-I' in FIG. 1, of the window member 300 corresponding to a sensing area according to an embodiment of the inventive concept.

Referring to FIGS. 1 and 2, the window member 300 is disposed on the display panel 100 and covers the display panel 100. The window member 300 includes a base substrate 310, a first printed layer 320, and a second printed layer 330.

The base substrate 310 may have a transparent property and transmit light. For example, the base substrate 310 may be glass.

A transmitting area TA and a non-transmitting area NTA are defined in the base substrate 310. The transmitting area TA overlaps with the display area DA in the display panel 100 and the non-transmitting area NTA overlaps with the non-display area NDA in the display panel 100. Therefore, light emitted from the display area DA in the display panel 100 passes through the transmitting area TA in the base substrate 310, and thus an image may be displayed on the base substrate 310.

The non-transmitting area NTA is disposed adjacent to the edge region of the transmitting area NTA. The first printed layer 320 and the second printed layer 330 may be formed on the non-transmitting area NTA in the base substrate 310. Thus, unlike in the display area DA, light emitted from the display panel 100 is blocked by the first printed layer 320 and the second printed layer 330, and thus an image is not displayed in the non-transmitting area NTA in the base substrate 310.

Specifically, the first printed layer 320 may be disposed on the base substrate 310 so as to correspond with the non-transmitting area NTA. The first printed layer 320 is in contact with the base substrate 310.

The non-transmitting area NTA includes a sensing area SA. When a user or an object is near the sensing area SA in the display device 1000, whether or not the display device 1000 should display an image, etc. may be determined. Hereinafter, the sensing area SA is described in greater detail.

A first opening OP1 and a second opening OP2 may be defined in the first printed layer 320. The first opening OP1 is disposed adjacent to the second opening OP2. The first opening OP1 and the second opening OP2 overlap with the sensing area SA. That is, the first printed layer 320 is not disposed in some areas of the sensing area SA which overlap with the first opening OP1 and the second opening OP2. The first opening OP1 and the second opening OP2 have a first width W1.

In an embodiment of the inventive concept, the first opening OP1 and the second opening OP2 are disposed space apart, but the embodiments of the inventive concept are not limited thereto. Exemplarily, in another embodiment of the inventive concept, the first opening OP1 and the second opening OP2 may have the form of a single body such that only a single opening is defined in the first printed layer 320.

The first printed layer 320 has a predetermined color and is exposed on the base substrate 310. The first printed layer 320 may have a bright color. Exemplarily, the first printed layer 320 may have a color that reflects at least 3% of the external light. In a desirable embodiment, the first printed layer 320 may have a white color. That is, the first printed layer 320 may reflect at least 88% of the external light.

The first printed layer 320 may have a multilayered form including a plurality of laminated layers. In a specific example, the first printed layer 320 may include a first sub-printed layer 320a and a second sub-printed layer 320b. The first sub-printed layer 320a is disposed on the base substrate 310 so as to be in contact with the base substrate 310, and the second sub-printed layer 320b is disposed on the first sub-printed layer 320a. The second sub-printed layer 320b overlaps with the first sub-printed layer 320a. The second sub-printed layer 320b is entirely blocked by the first sub-printed layer 320a, and thus is not exposed on the base substrate 310.

In the embodiment, the first printed layer 320 includes two sub-printed layers 320a and 320b, but embodiments of the inventive concept are not limited by the number of the sub-printed layers 320a and 320b. According to another embodiment of the inventive concept, the first printed layer 320 may have the form of a single layer or include three or more sub-printed layers.

The brightness or saturation of the first printed layer 320 may change according to the number of sub-printed layers included in the first printed layer 320. According to an embodiment of the inventive concept, the color in the first printed layer 320 may increase in sharpness as the number of sub-printed layers in the first printed layer 320 increases.

The second printed layer 330 is disposed on the first printed layer 320. On a plane, the second printed layer 330 overlaps the first printed layer 320. The blocking function of the first printed layer 320 may be enhanced by the second printed layer 330. The second printed layer 330 is entirely blocked by the first printed layer 320, and thus is not exposed on the base substrate 310.

The second printed layer 330 may have a darker color than the first printed layer 320. Exemplarily, the second printed layer 330 may have a black color.

Figure 3:
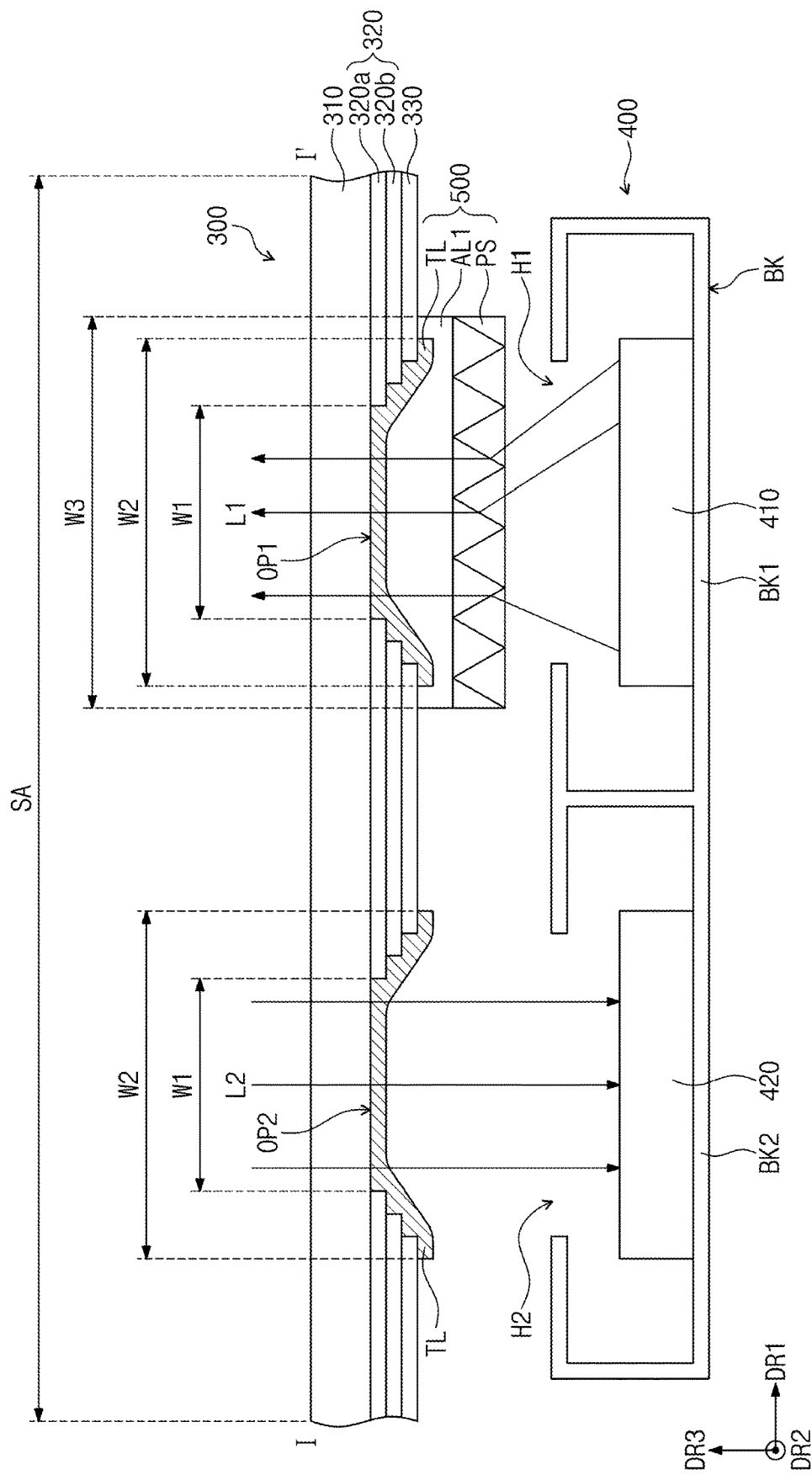
FIG. 3 is a cross-sectional view, along I-I' in FIG. 1, of the display device corresponding to a sensing area according to an embodiment of the inventive concept.

FIG. 3 is a cross-sectional view, along I-I' in FIG. 1, of the display device 1000 corresponding to the sensing area SA according to an embodiment of the inventive concept.

Referring to FIGS. 1 and 3, the proximity sensor 400 overlaps the sensing area SA. The proximity sensor 400 performs the role of sensing the distance to a nearby user or object, by providing a light and receiving a reflected light, that is, the provided light reflected by the outside.

Here, light provided to the outside by the proximity sensor 400 is defined as a first light L1, and light incident on the proximity sensor 400 after being reflected by the outside is defined as a second light L2. The first light L1 and the second light L2 may be infrared radiation. That is, the proximity sensor 400 may be an infrared radiation sensor.

Whether an image is displayed on the display panel 100 may depend on the distance between the user or object and the display device 1000. Thus, the proximity sensor 400 may reduce the power consumption of the display device 1000.

The proximity sensor 400 includes a light-emitting part 410 and a light-receiving part 420. The light-emitting part 410 overlaps with the first opening OP1 in the window member 300. The light-emitting part 410 provides the first light L1 to the outside through the first opening OP1. The light-emitting part 410 may be an infrared diode.

The light-receiving part 420 may overlap with the second opening OP2. The light-receiving part 420 receives the second light L2 through the second opening OP2.

The proximity sensor 400 further includes a bracket BK. The bracket BK stores the light-emitting part 410 and the light-receiving part 420. Specifically, the bracket BK includes a first bracket BK1 and a second bracket BK2. The first bracket BK1 may be combined with the second bracket BK2.

The first bracket BK1 stores the light-emitting part 410. A first hole H1 is defined in the first bracket BK1. The first hole H1 overlaps with the first opening OP1. The first light L1 generated from the light-emitting part 410 is provided to the outside by sequentially passing through the first hole H1 and the first opening OP1.

The second bracket BK2 stores the light-receiving part 420. A second hole H2 is defined in the second bracket BK2. The second hole H2 overlaps with the second opening OP2. The second light L2 incident from the outside is provided to the light-receiving part 420 by sequentially passing through the second opening OP2 and the second hole H2.

An optical member 500 is disposed between the proximity sensor 400 and the window member 300. The optical member 500 may include a light-transmitting layer TL and a prism sheet PS. The light-transmitting layer TL is disposed on the base substrate 310 so as to cover each of the first opening OP1 and the second opening OP2. The light-transmitting layer TL overlapping the first opening OP1 and the second opening OP2 may have a portion that is in contact with the base substrate 310. Thus, the portion of the light-transmitting layer TL may be exposed on the base substrate 310 through the first opening OP1 and the second opening OP2.

According to an embodiment of the inventive concept, the transmittance of the light-transmitting layer TL with respect to light in the wavelength range of infrared radiation is higher than the transmittance of the light-transmitting layer TL with respect to light in the wavelength range of visible light. Thus, visible light incident from the outside to the first opening OP1 and the second opening OP2 may be reflected instead of transmitted by the light-transmitting layer TL. That is, the inside of the display device 1000 may not be exposed through the first opening OP1 and the second opening OP2.

Moreover, the light-transmitting layer TL according to an embodiment of the inventive concept may be printed in the form of ink on the base substrate 310. Exemplarily, the light-transmitting layer TL may be infrared (IR) ink.

The light-transmitting layer TL may have a second width W2. The second width W2 may be larger than a first width W1 of the first opening OP1 and the second opening OP2. Thus, the light-transmitting layer TL may overlap with a portion of the first printed layer 320 and a portion of the second printed layer 330. That is, the outermost edge region of the light-transmitting layer TL may cover a portion of the second printed layer 330.

The prism sheet PS may be disposed between the light-transmitting layer TL and the proximity sensor 400. The prism sheet PS may be spaced apart a predetermined distance from the proximity sensor 400. The prism sheet PS may be disposed so as to overlap with the first hole H1 in the first bracket BK1. According to an embodiment of the inventive concept, the prism sheet PS does not overlap with the second hole H2 in the second bracket BK2.

The prism sheet PS may have a third width W3. The third width W3 may be equal to or larger than the first width W1 of the first opening OP1. Moreover, the third width W3 is larger than the second width W2 of the light-transmitting layer TL. However, embodiments of the inventive concept are not limited thereto. Exemplarily, according to another embodiment of the inventive concept, the third width W3 may be equal to or smaller than the second width W2.

The prism sheet PS provides the first light L1 from the light-emitting part 410 by changing the direction of the first light L1, provided to the prism sheet PS from the light-emitting part 410, to a predetermined direction. The prism sheet PS is described below in more detail with reference to FIG. 4.

The display device 1000 according to an embodiment of the inventive concept may further include a first adhesive layer AL1. The first adhesive layer AL1 is disposed between the light-transmitting layer TL and the prism sheet PS and attaches the light-transmitting layer TL with the prism sheet PS. The first adhesive layer AL1 may be a resin, a pressure sensitive adhesive (PSA), or an optically clear adhesive (OCA or OCR).

Figure 4:
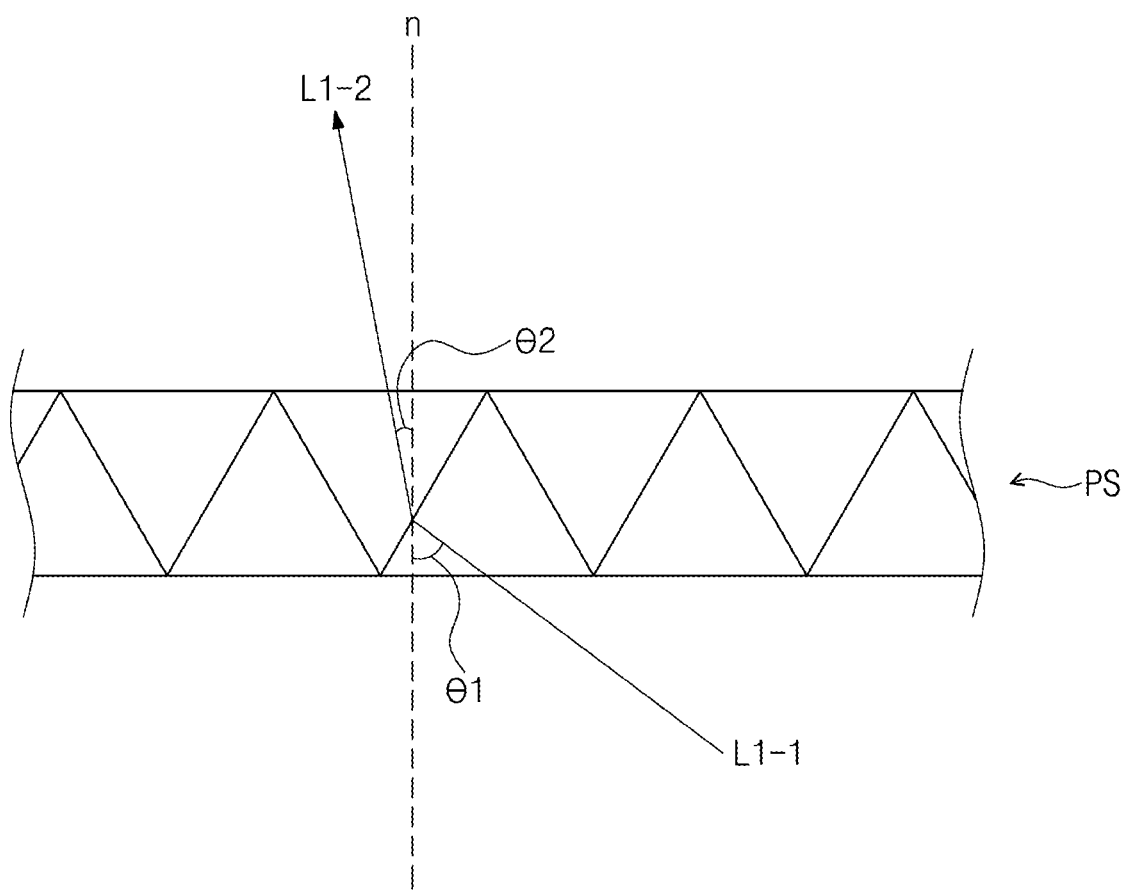
FIG. 4 is an expanded view of a prism sheet illustrated in FIG. 3.

FIG. 4 is an expanded view of the prism sheet PS illustrated in FIG. 3.

Referring to FIGS. 3 and 4, the direction of travel of the first light L1 generated from the light-emitting part 410 may be changed while the first light L1 passes through the prism sheet PS. Here, among the first light L1, the light incident from the light-emitting part 410 to the prism sheet PS is defined as an incident light L1-1 and the light emitted to the outside by passing through the prism sheet PS is defined as an emitted light L1-2.

The prism sheet PS performs the role of refracting the incident light L1-1, that is, among the first light L1, the light incident at an oblique angle on the prism sheet PS, such that the direction thereof is approximately parallel with the direction of the normal line n of the display device 1000. That is, the prism sheet PS reduces the angle between the first light L1 incident on the base substrate 310 and the normal line n. Specifically, the first angle θ1 between the incident light L1-1 and the normal line n is greater than the second angle θ2 between the emitted light L1-2 and the normal line n.

When, in contrast to embodiments of the inventive concept, the first light L1 is incident at an oblique angle on the base substrate 310, a portion of the light reflected from the base substrate 310 may be scattered by the first printed layer 320. That is, even when a nearby user or object is not present, the light-receiving part 420 in the proximity sensor 400 may receive the scattered light from the first printed layer 320, thereby causing a malfunction or being made unable to accurately detect the distance to the nearby user or object. However, according to an embodiment of the inventive concept, since the first light L1 provided from the light-emitting part 410 is refracted by the prism sheet PS such that the first light L1 is provided to the outside in a direction approximately parallel with the direction of the normal line n of the display device 1000, scattered reflection of the first light L1 may be prevented. That is, the reliability of the proximity sensor 400 may be improved.

Figure 5B:
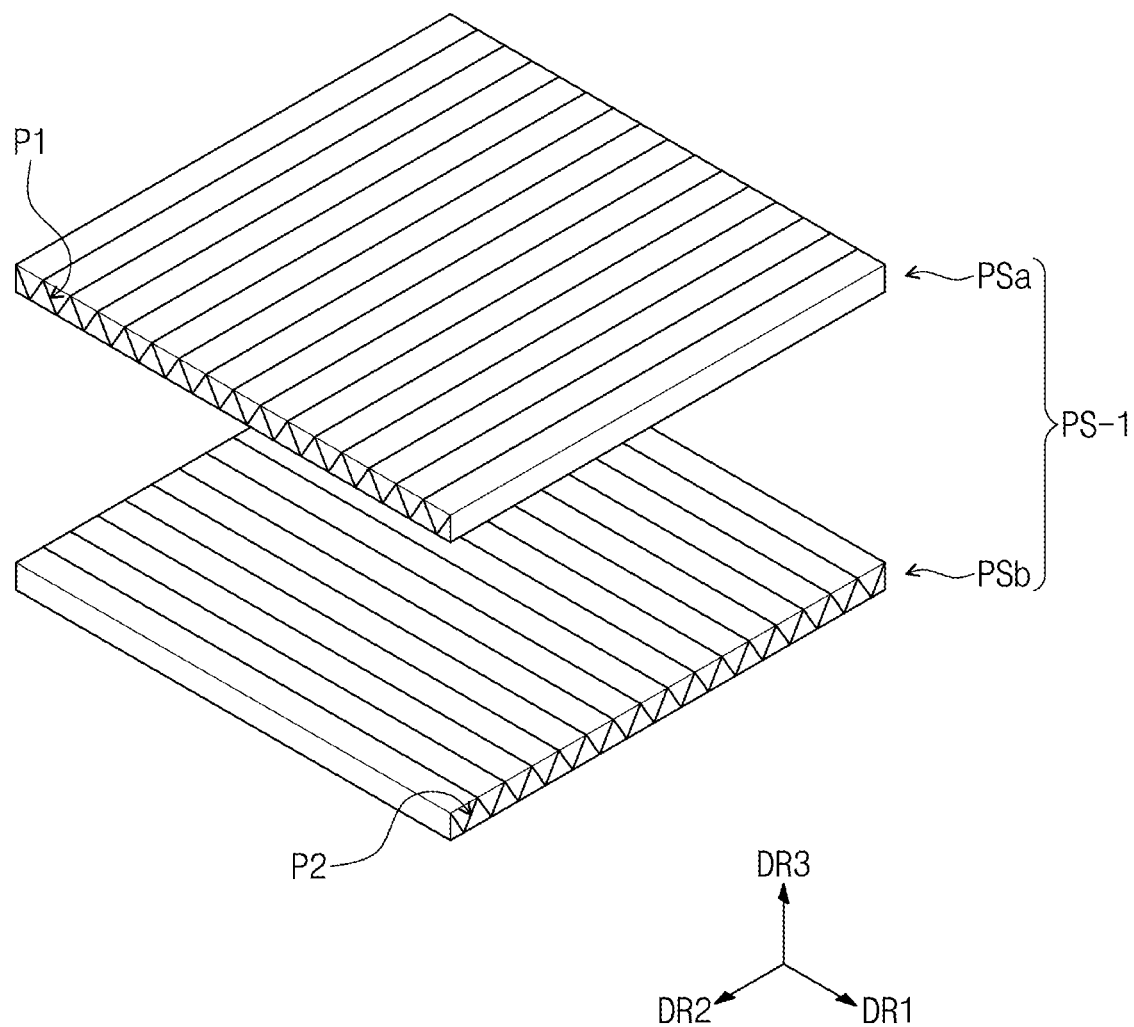
FIG. 5B is a perspective view of a prism sheet illustrated in FIG. 5A.

FIG. 5A is a cross-sectional view illustrating a display device according to another embodiment of the inventive concept. FIG. 5B is a perspective view of a prism sheet PS-1 illustrated in FIG. 5A. For convenience of description, description will focus on the differences with an embodiment of the inventive concept, and excluded areas are in accordance with an embodiment of the inventive concept. Moreover, identical reference numerals will be used for elements described above, and repeated descriptions about such elements are excluded.

Referring to FIGS. 5A and 5B, the prism sheet PS-1 in an optical member 500-1 according to another embodiment of the inventive concept has a multilayered form including a plurality of laminated prism layers PSa and PSb. Exemplarily, the prism sheet PS-2 includes the first prism layer PSa and the second prism layer PSb.

The first prism layer PSa is disposed on a light-transmitting layer TL. According to an embodiment of the inventive concept, a first adhesive layer AL1 may be further disposed between the light-transmitting layer TL and the first prism layer PSa.

The second prism layer PSb is disposed on the first prism layer PSa. According to an embodiment of the inventive concept, a prism adhesive layer PAL may be further disposed between the first prism layer PSa and the second prism layer PSb. The prism adhesive layer PAL attaches the first prism layer PSa with the second prism layer PSb. The prism adhesive layer PAL may be a resin, a pressure sensitive adhesive (PSA), or an optically clear adhesive (OCA or OCR).

Each of the first prism layer PSa and the second prism layer PSb includes a plurality of prisms.

Specifically, the first prism layer PSa includes a plurality of first prisms P1, each extending in a second direction DR2. The first prisms P1 are arranged in a first direction DR1. The first prism layer PSa performs the role of adjusting a first direction DR1 component of a first light L1. Specifically, the first prism layer PSa may reduce the angle formed between the first light L1 and a third direction DR3 on a plane defined by the first direction DR1 and the third direction DR3, that is, reduce the first direction DR1 component of the first light L1.

The second prism layer PSb includes a plurality of second prisms P2, each extending in the first direction DR1. The second prisms P2 may perform the role of adjusting a second direction DR2 component of the first light L1. Specifically, the second prism layer PSb may reduce the angle formed between the first light L1 and the third direction DR3 on a plane defined by the second direction DR2 and the third direction DR3, that is, reduce the second direction DR2 component of the first light L1.

According to the embodiment, the size of each of the first direction DR1 component and the second direction DR2 component of the first light L1 which passes through the prism sheet PS-1 may be reduced. Thus, scattered reflection of the first light L1 may be more effectively prevented.

Figure 6:
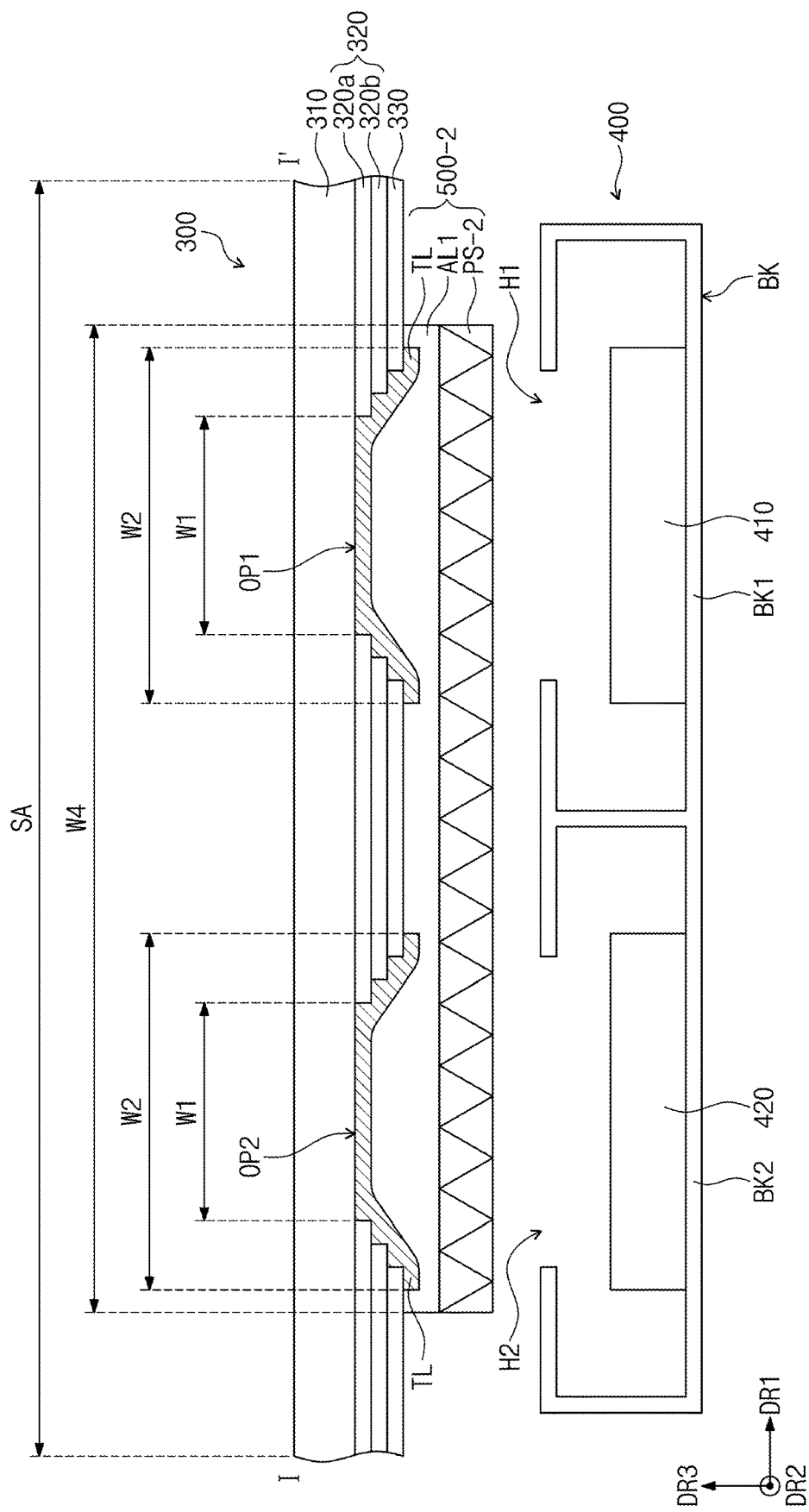
FIG. 6 is a cross-sectional view of a display device according to another embodiment of the inventive concept.

FIG. 6 is a cross-sectional view of a display device according to another embodiment of the inventive concept. For convenience of description, description will focus on the differences with embodiments of the inventive concept described above, and excluded areas are in accordance with an embodiment of the inventive concept. Moreover, identical reference numerals will be used for elements described above, and repeated descriptions about such elements are excluded.

Referring to FIG. 6, a prism sheet PS-2 in an optical member 500-2 according to another embodiment of the inventive concept is disposed so as overlap with a first hole H1 in a first bracket BK1 and a second hole H2 in a second bracket BK2. That is, the prism sheet PS-2 is disposed so as to overlap with a first opening OP1 and a second opening OP2.

The prism sheet PS-2 has a fourth width W4. According to the embodiment, the fourth width W4 may be greater than two times a second width W2.

In the embodiment, a single one of the prism sheet PS-2 may overlap with both of the first opening OP1 and the second opening OP2, but embodiments of the inventive concept are not limited thereto. Exemplarily, according to another embodiment of the inventive concept, a plurality of prism sheets PS-2 are provided, and the plurality of prism sheets PS-2 may overlap in one-to-one correspondence with the first opening OP1 and the second opening OP2.

According to the embodiment, since the prism sheet PS-2 overlaps with not only the first opening OP1 but also the second opening OP2, the prism sheet PS-2 may collect a second light (not shown) which is reflected from the outside and incident through the second opening OP2. Thus, losses to the intensity of the second light (not shown) provided to a receiving part 420 may be reduced.

Figure 7:
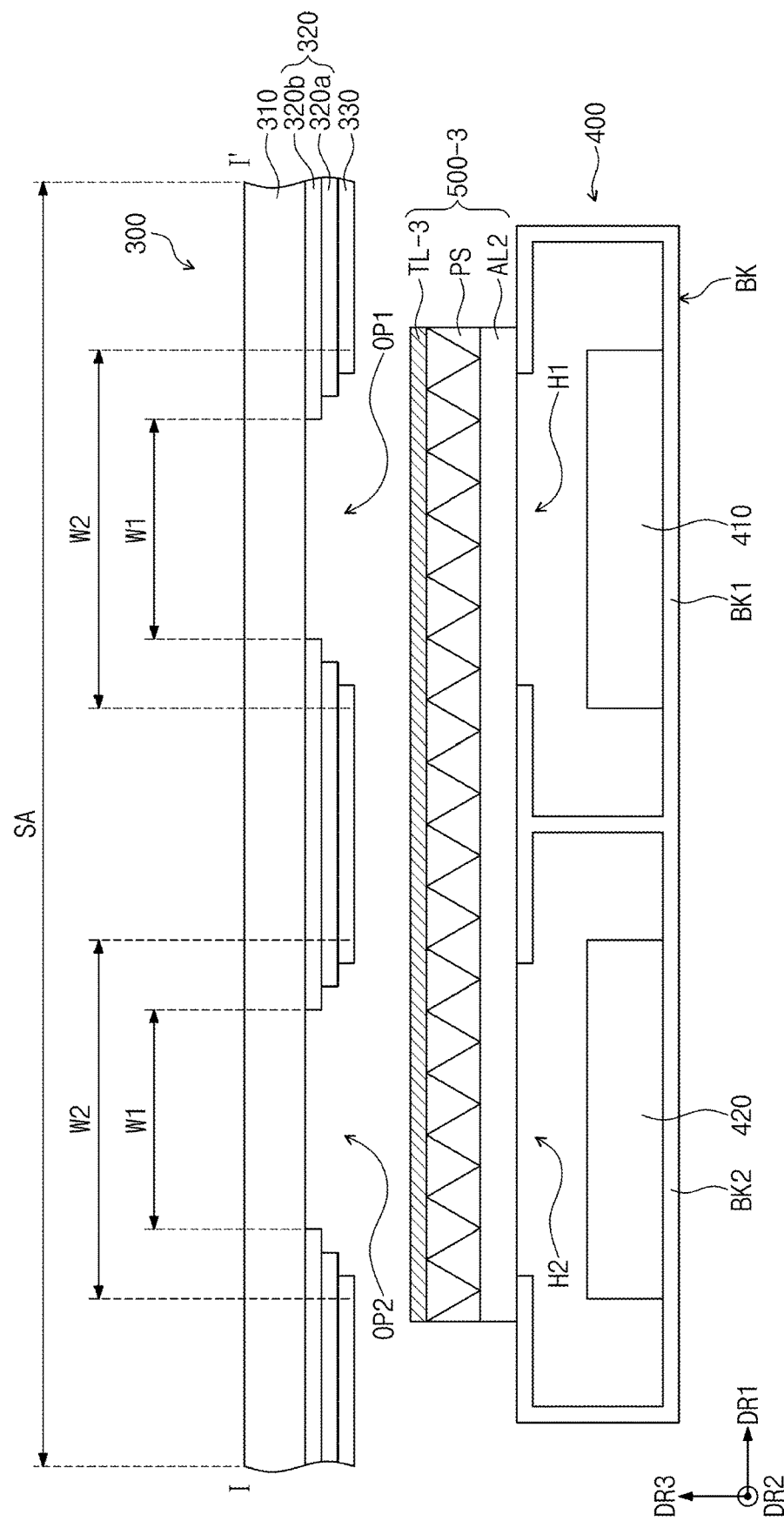
FIG. 7 is a cross-sectional view of a display device according to another embodiment of the inventive concept.

FIG. 7 is a cross-sectional view of a display device according to another embodiment of the inventive concept. For convenience of description, description will focus on the differences with embodiments of the inventive concept described above, and excluded areas are in accordance with an embodiment of the inventive concept. Moreover, identical reference numerals will be used for elements described above, and repeated descriptions about such elements are excluded.

Referring to FIG. 7, an optical member 500-3 according to another embodiment of the inventive concept may be in contact with a proximity sensor 400 and spaced apart a predetermined distance from a window member 300.

According to the embodiment, a second adhesive layer AL2 may be further disposed between a prism sheet PS and the proximity sensor 400. The prism sheet PS may be attached with the proximity sensor 400 by the second adhesive layer AL2. The second adhesive layer AL2 may be a resin, a pressure sensitive adhesive (PSA), or an optically clear adhesive (OCA or OCR).

The second adhesive layer AL2 may be disposed over the entire bottom face of the prism sheet PS, but may also be disposed on a region of the prism sheet PS exclusive of a first hole H1 and a second hole H2 in the proximity sensor 400.

A light transmitting layer TL-3 according to the embodiment may be provided in the form of an ink and printed on the prism sheet PS. That is, the light-transmitting layer TL-3 is not in contact with a base substrate 310.

Figure 8:
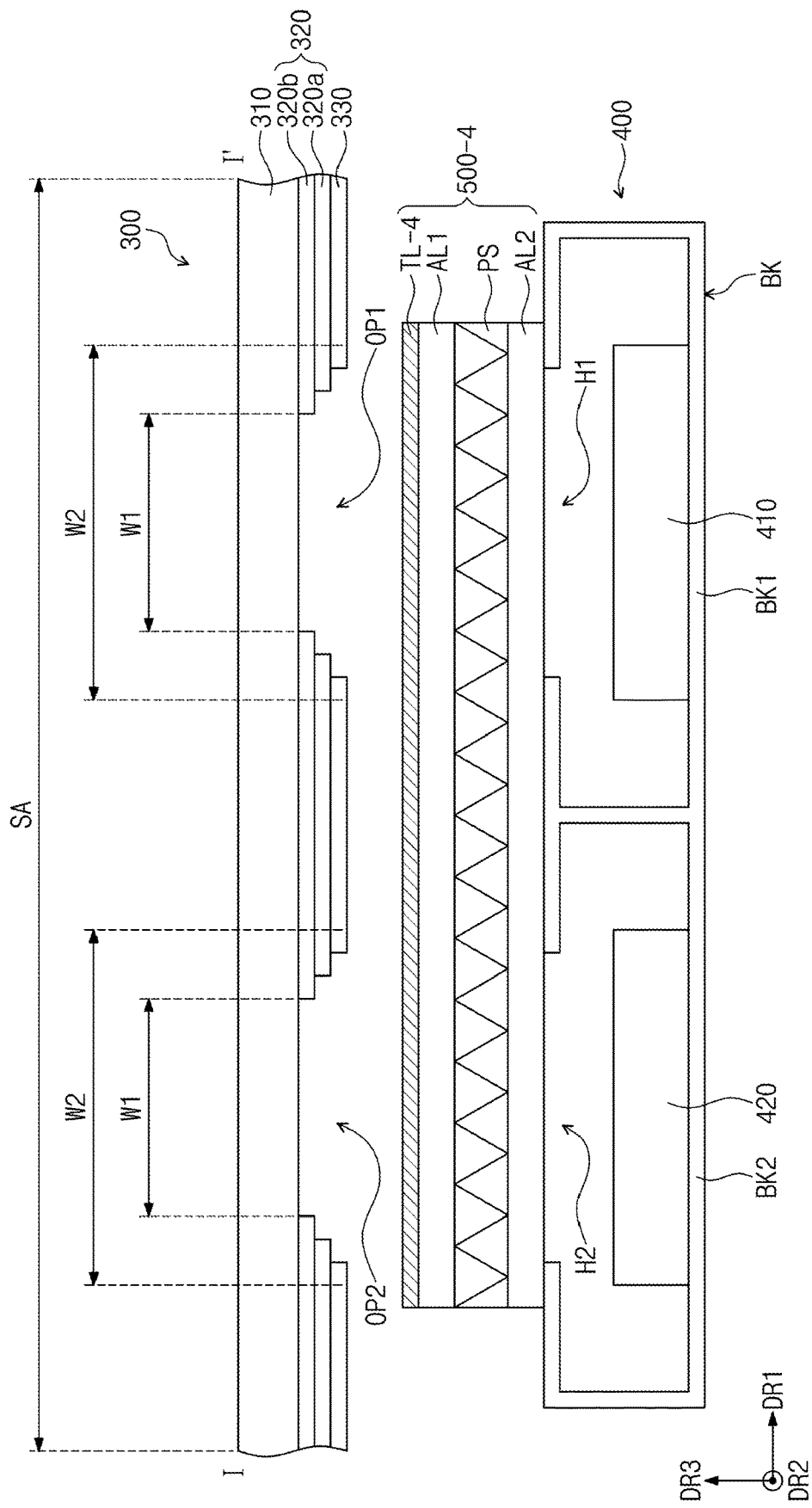
FIG. 8 is a cross-sectional view of a display device according to another embodiment of the inventive concept.

FIG. 8 is a cross-sectional view of a display device according to another embodiment of the inventive concept. For convenience of description, description will focus on the differences with embodiments of the inventive concept described above, and excluded areas are in accordance with the embodiment described with reference to FIG. 7. Moreover, identical reference numerals will be used for elements described above, and repeated descriptions about such elements are excluded.

Referring to FIG. 8, a light-transmitting layer TL-4 in an optical member 500-4 according to another embodiment of the inventive concept may be provided in the form of a sheet. Exemplarily, the light-transmitting layer TL-4 may be an infrared (IR) sheet.

According to the embodiment, a first adhesive layer AL1 may be disposed between the light-transmitting layer TL-4 and a prism sheet PS. The first adhesive layer AL1 may be a resin, a pressure sensitive adhesive (PSA), or an optically clear adhesive (OCA or OCR).

Figure 9:
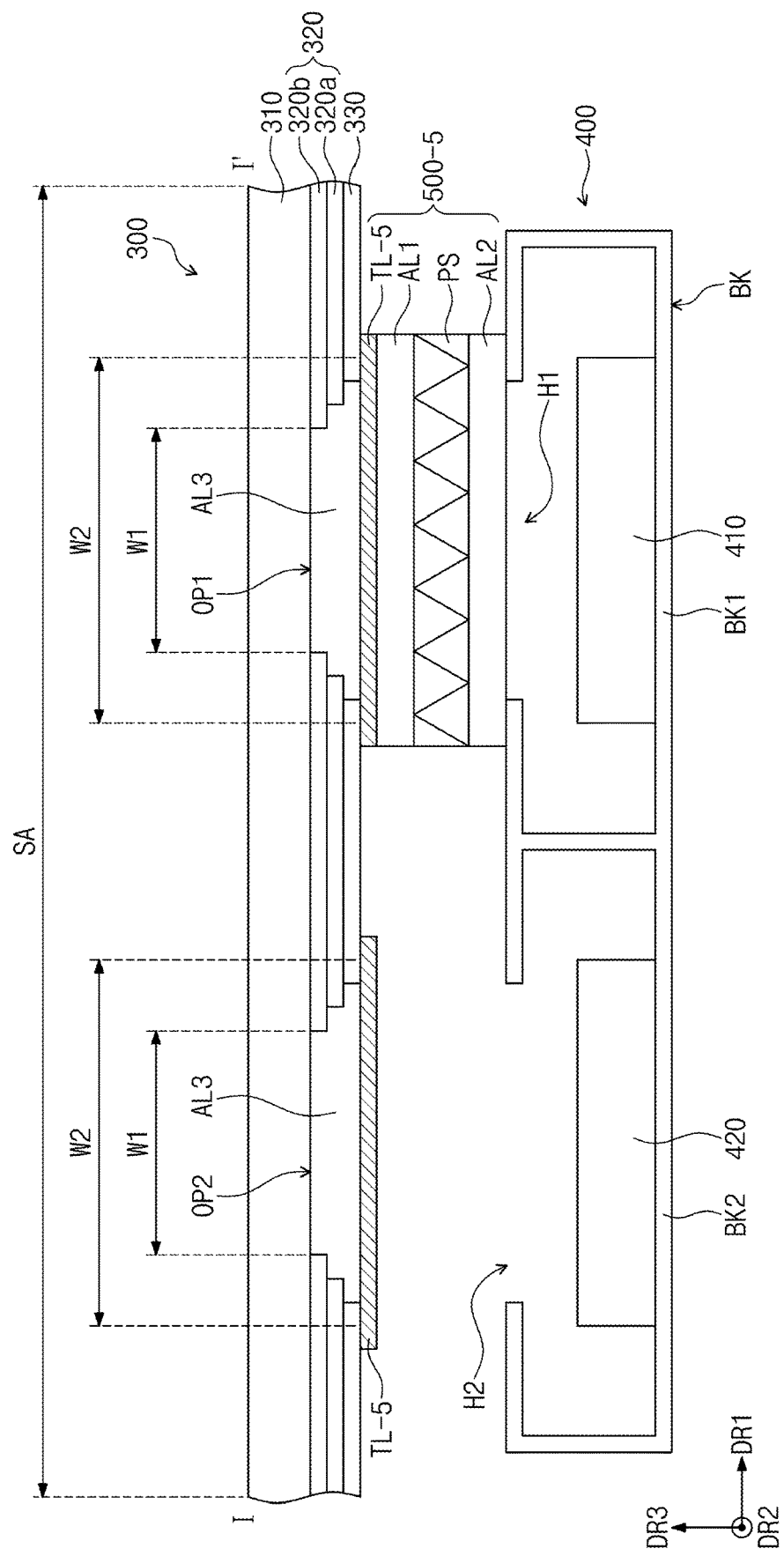
FIG. 9 is a cross-sectional view of a display device according to another embodiment of the inventive concept.

FIG. 9 is a cross-sectional view of a display device according to another embodiment of the inventive concept. For convenience of description, description will focus on the differences with embodiments of the inventive concept described above. Moreover, identical reference numerals will be used for elements described above, and repeated descriptions about such elements are excluded.

Referring to FIG. 9, an optical member 500-5 according to another embodiment of the inventive concept is disposed between a window member 300 and a proximity sensor 400, and the front face and rear face of the optical member 500-5 may be attached with the window member 300 and the proximity sensor 400, respectively. Specifically, the front face of the optical member 500-5 is attached with the window member 300 and the rear face is attached with the proximity sensor 400.

According to the embodiment, a third adhesive layer AL3 may be further disposed between the optical member 500-5 and the window member 300. The third adhesive layer AL3 may be filled into a space defined by the sides of a first printed layer 320 and a second printed layer 330, and a first opening OP1.

According to the present embodiment, a configuration is illustrated in which a light-transmitting layer TL-5 is provided in the form of a sheet, but embodiments of the inventive concept are not limited thereto. Exemplarily, according to another embodiment of the inventive concept, the light-transmitting layer TL-5 may be in the form of an ink, and in such a case, a first adhesive layer AL1 may be excluded.

Consequently, according to the embodiment, since the optical member 500-5 is fixed between the window member 300 and the proximity sensor 400, the durability of a display device 1000 may be improved.

Figure 10:
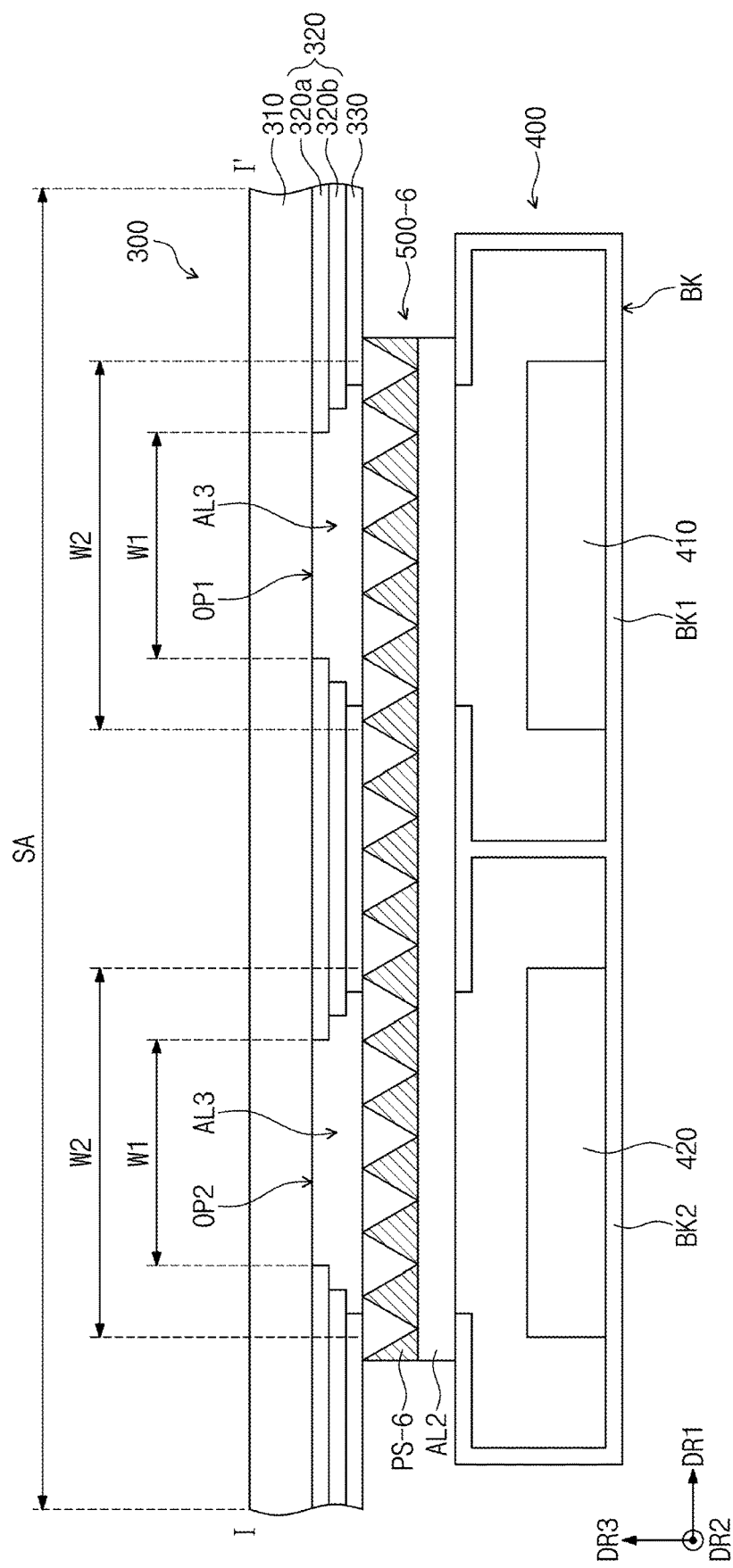
FIG. 10 is a cross-sectional view of a display device according to another embodiment of the inventive concept.

FIG. 10 is a cross-sectional view of a display device according to another embodiment of the inventive concept.

Referring to FIG. 10, a prism sheet PS-6 in an optical member 500-6 according to another embodiment of the inventive concept overlaps with a first opening OP1 and a second opening OP2.

The transmittance of the prism sheet PS-6 with respect to light in the wavelength range of infrared radiation is greater than the transmittance of the prism sheet PS-6 with respect to light in the wavelength range of visible light. Exemplarily, the prism sheet PS-6 according to the embodiment may include infrared (IR) ink. Thus, visible light incident to the first opening OP1 and the second opening OP2 may be reflected rather than transmitted by the prism sheet PS-6. That is, according to the embodiment, the light-transmitting layer (not shown) may be excluded.

The front face of the prism sheet PS-6 may be attached with a window member 300 by a third adhesive layer AL3, and attached with a proximity sensor 400 by a second adhesive layer AL2. However, embodiments of the inventive concept are not limited thereto, and one among the second adhesive layer AL2 and the third adhesive layer AL3 may be excluded. Exemplarily, according to another embodiment, the second adhesive layer AL2 may be excluded and thus the proximity sensor 400 may be spaced apart a predetermined distance from the optical member 500-6, or the third adhesive layer AL3 may be excluded and thus the window member 300 may be spaced apart a predetermined distance from the optical member 500-6.

Consequently, according to embodiments of the inventive concept described above, the reliability of the proximity sensor 400 may be improved.

Although the exemplary embodiments have been described, it is understood that the inventive concept should not be limited to these exemplary embodiments but various changes and modifications can be made by one ordinary skilled in the art within the spirit and scope of the inventive concept as hereinafter claimed. Moreover, the embodiments disclosed herein are not intended to limit the technical scope of the inventive concept, rather, it is to be understood that the inventive concept includes the entire scope of the claims below and equivalent technical concepts thereof.

What is claimed is:

1. A display device comprising:
a display panel configured to display an image;
a window member covering the display panel and having a first opening and a second opening in a sensing area which is defined on a plane;
a proximity sensor which is disposed on the window member so as to overlap with the sensing area, configured to provide a first light to the window member through the first opening and receive a portion of a second light through the second opening, the second light being defined as a reflected light of the first light; and
an optical member comprising a prism sheet disposed between the window member and the proximity sensor,
wherein a first angle between the first light incident from the proximity sensor to the prism sheet and a normal line of the window member, the normal line being perpendicular to the window member, is greater than a second angle between the first light which passes through the prism sheet and the normal line of the window member.

2. The display device of claim 1, wherein the window member comprises:
a base substrate having defined therein a display area which is configured to transmit the image and a non-display area which is adjacent to at least a portion of the display area and includes the sensing area;
a first printed layer disposed on the base substrate so as to overlap with the non-display area; and
a second printed layer disposed on the first printed layer so as to overlap with at least a portion of the first printed layer, wherein the first opening and the second opening are defined in the first printed layer and the second printed layer.

3. The display device of claim 2, wherein the proximity sensor comprises:
   a light-emitting part overlapping with the first opening and configured to generate the first light; and
   a light-receiving part overlapping with the second opening and configured to receive the portion of the second light.

4. The display device of claim 3, wherein the optical member further comprises a light-transmitting layer disposed between the base substrate and the prism sheet, and overlapping with the first opening and the second opening.

5. The display device of claim 4, wherein the transmittance of the light-transmitting layer with respect to light in the wavelength range of infrared radiation is higher than the transmittance of the light-transmitting layer with respect to light in the wavelength range of visible light.

6. The display device of claim 4, wherein:
   the planar width of the light-transmitting layer is greater than the planar width of the first opening; and
   the light-transmitting layer is disposed so as to cover at least a portion of the first and the second printed layers.

7. The display device of claim 6, wherein the prism sheet is disposed so as to overlap with the first opening and the second opening.

8. The display device of claim 6, wherein the optical member further comprises a first adhesive layer which is disposed between the light-transmitting layer and the prism sheet, and attaches the light-transmitting layer with the prism sheet.

9. The display device of claim 6, wherein a portion of the light-transmitting layer makes contact with the base substrate.

10. The display device of claim 6, wherein the optical member further comprises a second adhesive layer which is disposed between the prism sheet and the proximity sensor, and attaches the prism sheet with the proximity sensor.

11. The display device of claim 6, wherein the optical member further comprises a third adhesive layer which is disposed between the light-transmitting layer and the base substrate, and attaches the light-transmitting layer with the base substrate.

12. The display device of claim 6, wherein the prism sheet comprises:
   a first prism layer comprising first prisms arranged in a first direction; and
   a second prism layer comprising second prisms arranged in a second direction intersecting the first direction.

13. The display device of claim 3, wherein the proximity sensor further comprises:
   a first bracket which accommodates the light-emitting part; and
   a second bracket which accommodates the light-receiving part,
   wherein a first hole corresponding to the first opening is defined at the first bracket and a second hole corresponding to the second opening is defined at the second bracket.

14. The display device of claim 2, wherein the transmittance of the prism sheet with respect to light in the wavelength range of infrared radiation is greater than the transmittance of the prism sheet with respect to light in the wavelength range of visible light.

15. The display device of claim 2, wherein the first printed layer has a white color.

16. The display device of claim 2, wherein the second printed layer has a black color.

17. The display device of claim 1, wherein the first light and the second light have a wavelength range in the wavelength range of infrared radiation.

18. A display device comprising:
   a base substrate;
   a first printed layer which is disposed on the base substrate, is provided with a first opening and a second opening, and is configured to reflect external light;
   a proximity sensor which is configured to emit a first light toward the first opening and receive through the second opening, a second light which is a reflected light of the first light; and
   a prism sheet which is disposed between the base substrate and the proximity sensor; and
   wherein a first angle between the first light incident from the proximity sensor to the prism sheet and a normal line of the prism sheet, the normal line being perpendicular to the prism sheet, is greater than a second angle between the first light which passes through the prism sheet and the normal line of the prism sheet.

19. The display device of claim 18, wherein the first printed layer has a color that is configured to reflect at least 3% of the external light.

* * * * *